United States Patent [19]
Thurman

[11] Patent Number: 6,104,429
[45] Date of Patent: Aug. 15, 2000

[54] INTEGRATION OF TV VIDEO WITH IR TRACKER FEATURES

[75] Inventor: Mark Thurman, Tucson, Ariz.

[73] Assignee: Raytheon Company, Lexington, Mass.

[21] Appl. No.: 08/393,528

[22] Filed: Feb. 23, 1995

Related U.S. Application Data

[63] Continuation of application No. 08/105,985, Aug. 10, 1993, abandoned.

[51] Int. Cl.$^7$ ....................................................... H04N 5/30
[52] U.S. Cl. ........................... 348/162; 348/169; 382/103
[58] Field of Search .................................... 348/162, 169, 348/170, 171, 172, 143; 382/103

[56] References Cited

U.S. PATENT DOCUMENTS

| | | | |
|---|---|---|---|
| 4,034,208 | 7/1977 | Vaeth et al. | 358/125 |
| 4,133,004 | 1/1979 | Fitts et al. | 358/125 |
| 4,719,584 | 1/1988 | Rue et al. | 358/126 |
| 4,773,754 | 9/1988 | Eisele | 356/152 |
| 4,958,224 | 9/1990 | Lepore et al. | 358/125 |
| 5,063,603 | 11/1991 | Burt | 382/37 |
| 5,187,777 | 2/1993 | Conboy et al. | 395/163 |
| 5,196,688 | 3/1993 | Hesse et al. | 358/125 |

*Primary Examiner*—Vu Le
*Attorney, Agent, or Firm*—David W. Collins; Andrew J. Rudd; Glenn H. Lenzen, Jr.

[57] ABSTRACT

A tracking system (200) adapted to receive input imagery and provide standard television format video input signals in response thereto. The video input signals are processed (228) to provide intermediate analog and digital signals. The intermediate analog signals are further processed (239) to provide centroid tracking of a target. The intermediate digital signals are processed (236) to provide correlation tracking of the target. In a specific implementation, the standard television format video input signals are provided by a charge coupled device (214), a Vidicon camera, an infrared focal plane array, a Newvicon camera or other device which generates standard television format video signals. A video rotation circuit may be used to provide proper image orientation regardless of the mounting orientation of the system. The invention provides a tracking system which allows for the direct use of video signals from a camera or other signal by a digital processing system without the requirement for scan conversion.

11 Claims, 5 Drawing Sheets

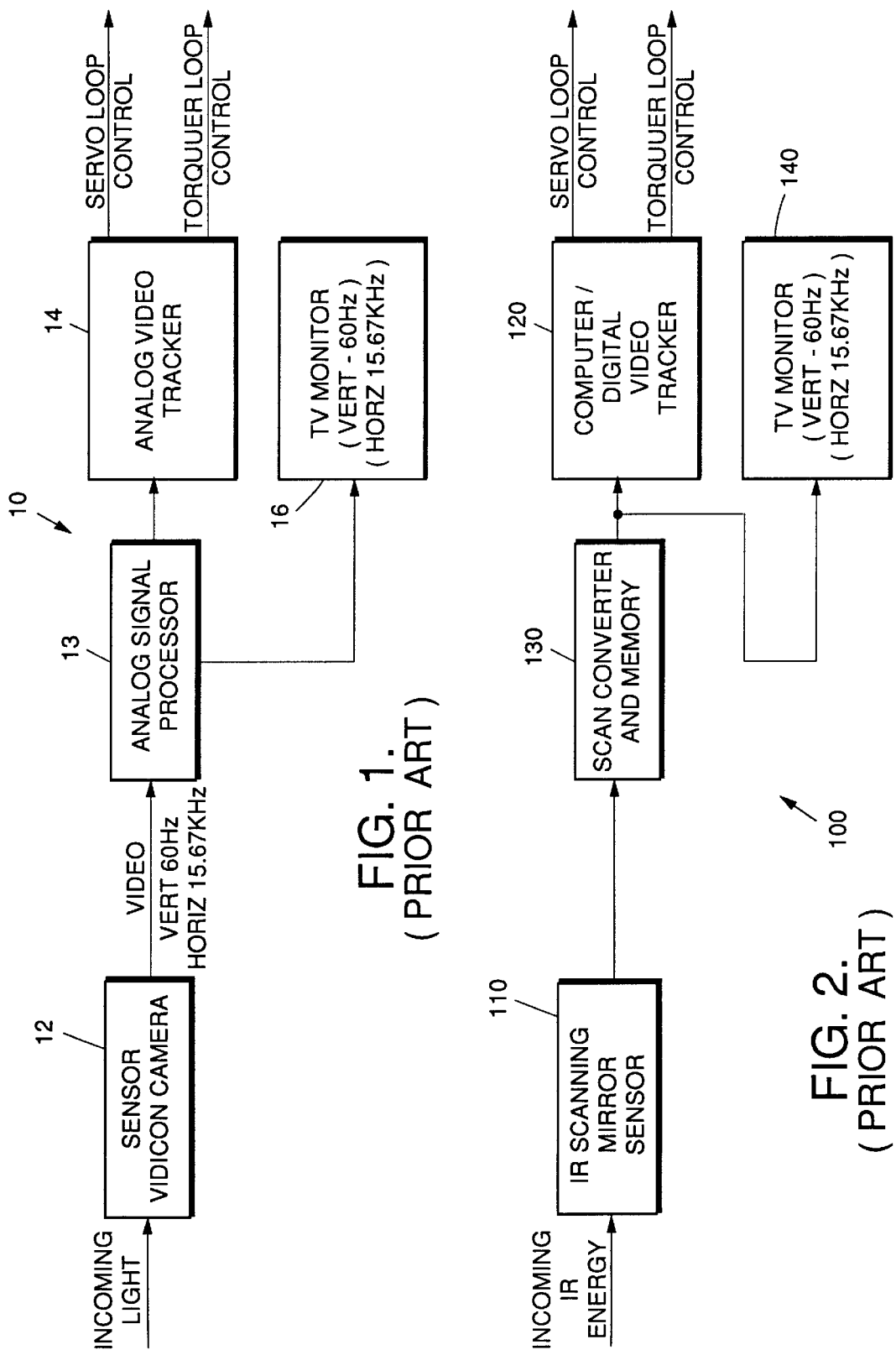

INTEGRATION OF TV VIDEO WITH IR TRACKER FEATURES

This is a continuation application Ser. No. 08/105,985 filed Aug. 10, 1993 now abandoned.

BACKGROUND OF THE INVENTION

1. Field of the Invention

The present invention relates to image processing systems. More specifically, the present invention relates to tracking systems.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Numerous missile tracking systems are known in the art including radar, infrared, television (TV) and laser based systems. For certain applications, tracking based on the detection of visible energy is advantageous. Certain conventional video missile tracking systems, such as the AGM 65A and B trackers, utilize a Vidicon camera to provide video signals to an analog video tracking system. The analog tracking system processed the incoming video signals to provide missile guidance control signals and servo loop control signals for the camera.

The use of a video camera allowed for a display of the camera output without further processing. The monitor allowed for a visual display of tracker performance. However, the analog processing of the video signals limited the ability of the system to keep pace with ever increasing performance requirements.

Accordingly, an improved tracking system was designed which included an infrared sensor and a digital tracker. However, although this system provided robust processor performance, the output of the infrared sensor had to be scan converted in order to be processed and displayed. The scan conversion requirement added to the cost and limited the performance of the system.

Thus, there has been a need in the art for a tracking system which allows for the direct use of video signals from a camera or other signal by a digital processing system without the requirement for scan conversion. There is a further need in the art for an inexpensive system for upgrading older analog video missile tracking systems with a digital signal processing capability.

SUMMARY OF THE INVENTION

The need in the art is addressed by the present invention which provides a tracking system adapted to receive input imagery and provide standard television format video input signals in response thereto. The video input signals are processed to provide intermediate analog and digital signals. The intermediate analog signals are further processed to provide centroid tracking of a target. The intermediate digital signals are processed to provide correlation tracking of the target.

In a specific implementation, the standard television format video input signals are provided by a charge coupled device, a Vidicon camera, an infrared focal plane array, a Newvicon camera or other device which generates standard television format video signals. A video rotation circuit may be used to provide proper image orientation regardless of the mounting orientation of the system.

The invention provides a tracking system which allows for the direct use of video signals from a camera or other signal by a digital processing system without the requirement for scan conversion. Further, the inventive system provides for an inexpensive upgrade of older analog video missile tracking systems.

BRIEF DESCRIPTION OF THE DRAWINGS

FIG. 1 is a simplified block diagram of a typical conventional TV tracking system with a Vidicon camera as an image sensor and an analog video tracker.

FIG. 2 is a simplified block diagram of a typical conventional infrared tracking system with a scanning mirror sensor and a digital video tracker.

DESCRIPTION OF THE INVENTION

Figure 3:
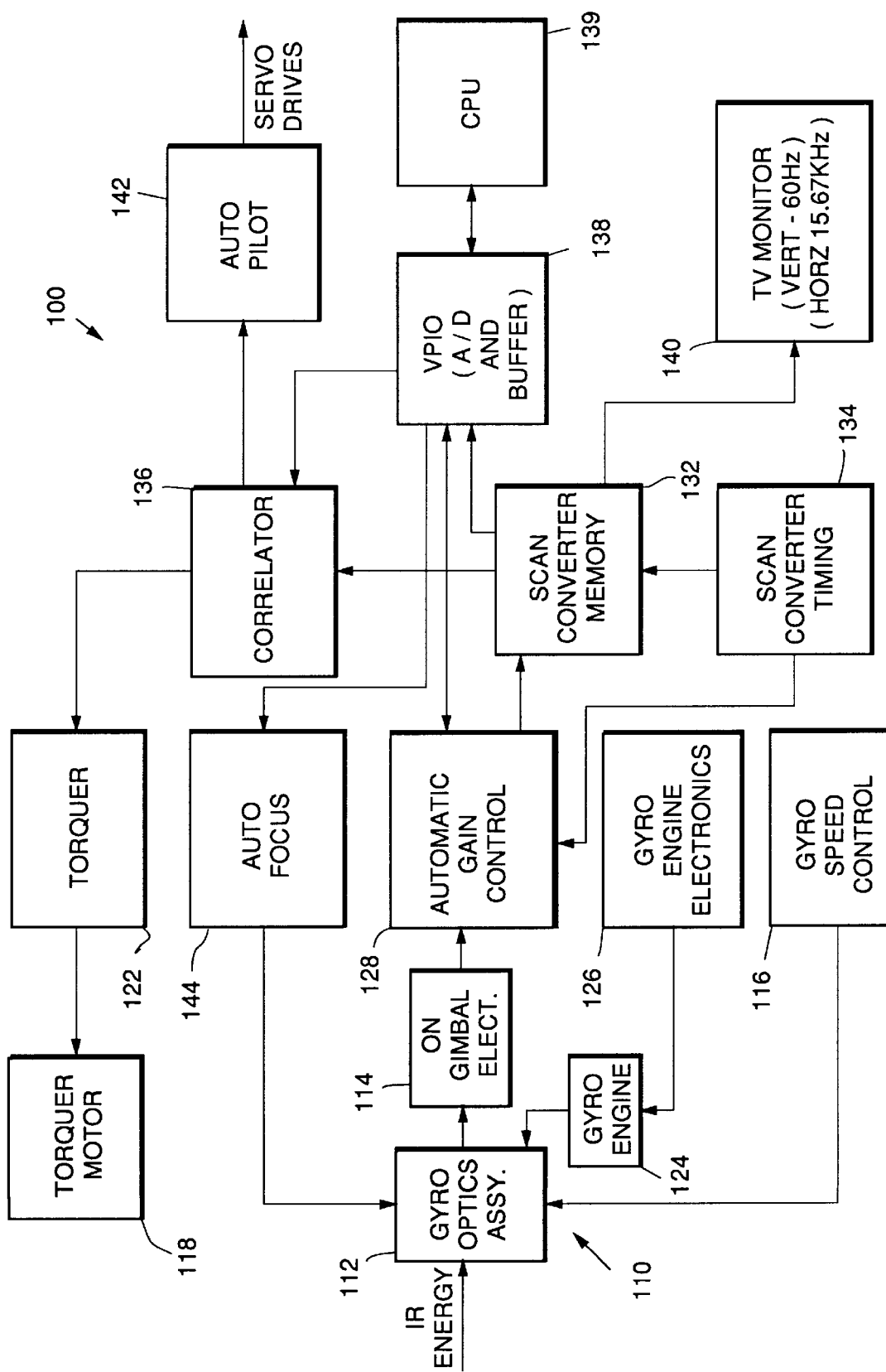
FIG. 3 is a detailed block diagram of a AGM 65D infrared tracking system with a scanning mirror sensor and mirror sensor and a digital video tracker.

Illustrative embodiments and exemplary applications will now be described with reference to the accompanying drawings to disclose the advantageous teachings of the present invention.

FIG. 1 is a simplified block diagram of a typical conventional TV tracking system 10 with a Vidicon camera 12 as an image sensor, an analog signal processor 13 and an analog video tracker 14. The Vidicon camera 12 provides an output signal in a standard television format, i.e., 60 hertz vertical sync and 15.67 horizontal synch. This signal is therefore readily displayed by an associated television monitor 16. As mentioned above, the analog tracking system 10 processes the incoming video signals to provide missile guidance (servo loop) control signals and torquer loop control signals for the camera 12.

The use of the video camera 12 allows for the display of the camera output without further processing. The monitor 16 allows for a visual display of tracker performance. However, the analog processing of the video signals limits the ability of the system to keep pace with ever increasing performance requirements.

The infrared tracking system 100 of FIG. 2 offers improved performance over the conventional TV system of FIG. 1. As illustrated in the simplified block diagram of FIG. 2, the system 100 includes an infrared sensor 110 and a digital video tracker 120. The infrared sensor 110 is implemented with a scanning mirror sensor which provides an analog output. The analog output of the scanning mirror sensor is scan converted to standard television video format by a scan converter 130 before it is input the digital tracker 120 and a TV monitor 140. Those skilled in the art will appreciate that the scan converter 130 also provides composite synch signals to the television monitor 140.

The simplified conventional infrared tracking system 100 of FIG. 2 is shown in greater detail in FIG. 3. The infrared scanning mirror sensor 110 is implemented with a gyro-optic assembly 112 and on-gimbal electronics 114. The gyro-optic assembly includes a scanning mirror and other optics (not shown) on a gyro-stabilized gimbal. The speed of the gyro (gyroscope) is controlled by a gyro-speed control circuit 116. The look angle of the gyro-optics assembly 112 is determined by a torquer motor under control of a torquer circuit 122. The infrared sensor is cooled by a cryogenic engine 124 which is controlled by a subsystem 126.

The analog output of the infrared scanning mirror sensor 110 is provided by the on-gimbal electronics circuit 114. This analog signal is supplied to an automatic gain control circuit 128 which is typically implemented with a multiplying digital-to-analog converter. The output of the automatic gain control circuit 128 is provided to the scan converter 130 and to the digital tracker 120. The scan converter 130 is implemented with a scan converter memory circuit 132 and a scan converter timing circuit 134. The scan converter 130 digitizes the analog output of the automatic gain control circuit 128, converts the signal to standard television format, converts the signal to analog and supplies the analog signal in standard television format to the digital tracker 120 and the monitor 140.

The digital tracker 120 is implemented with a correlator 136, a video processor input/output circuit 138, and a central processing unit 139. Threshold digitized video is provided to a correlator 136 by the scan converter 130. The central processing unit 139 provides centroid tracking functions while the correlator 136 provides correlation tracking functions. The correlator 136 generates controls for the torquer 122 and an autopilot 142. The autopilot 142 generates control signals for the guidance of a missile or other host control system. In addition, the central processing unit controls the level of the signal provided by the automatic gain control circuit 128 through the video processor input/output circuit 138. Similarly, focus control is implemented via the video processor input/output circuit 138 and an autofocus control circuit 144.

While the system of FIGS. 2 and 3 is effective, particularly for certain applications, the requirement of scan conversion adds to the cost and limits the versatility of the system with respect to other image sensing technologies.

Figure 4:
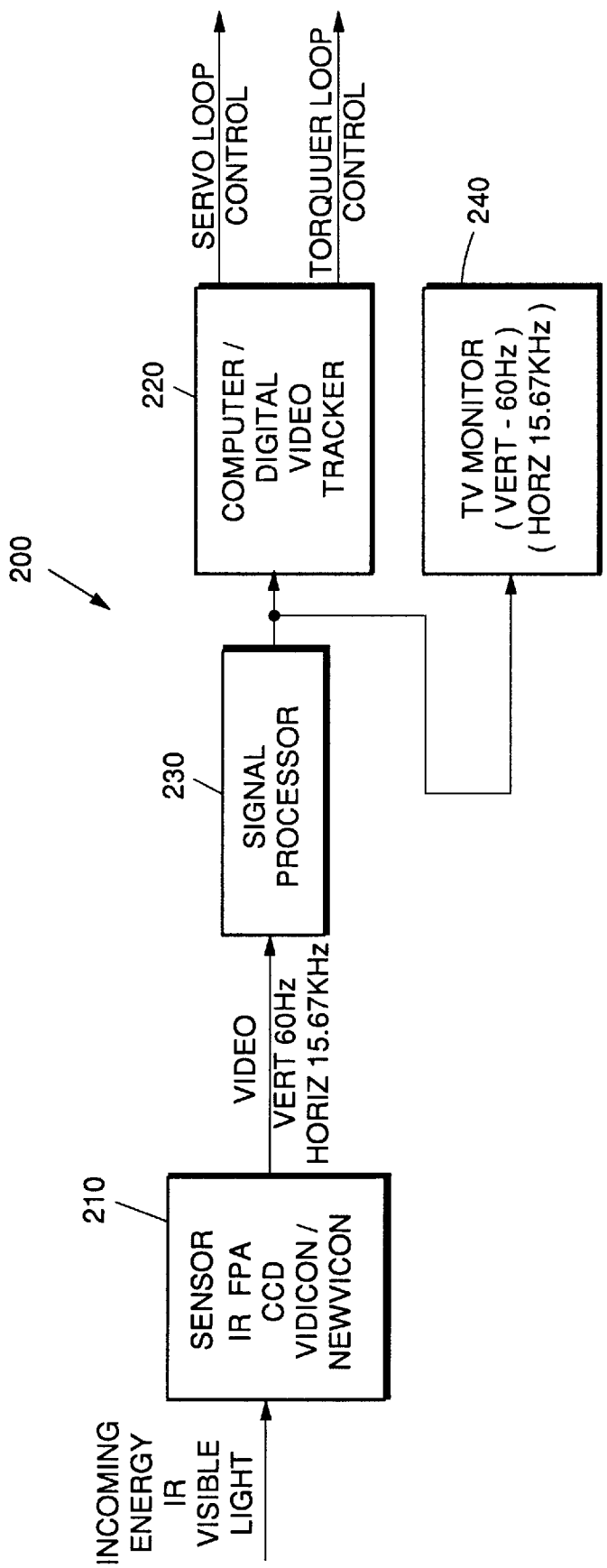
FIG. 4 is a simplified block diagram of an illustrative implementation of a video based digital tracking system incorporating the teachings of the present invention.

These shortcomings are addressed by the teachings of the present invention. FIG. 4 is a simplified block diagram of an illustrative implementation of an infrared tracking system 200 incorporating the teachings of the present invention. The system 200 includes an image sensor 210 and a digital video tracker 220. In accordance with the present teachings, the image sensor transforms incident visible or infrared energy to standard format television video signal. The image sensor may be implemented with a charge coupled device (CCD), an infrared focal plane array, a Vidicon camera, a Newvicon camera, or other suitable image sensing apparatus.

The standard television video output of the sensor 210 is provided to a signal processor 230. The signal processor 230 provides level shifting and image rotation (optional) of the video signal as discussed more fully below. The output of the signal processor is provided to the digital tracker 220 and a TV video monitor 240. The digital tracker 220 may be implemented as a forced correlation/mixed mode tracking system such as that shown and claimed in U.S. Pat. No. 4,958,224, entitled FORCED CORRELATION/MIXED MODE TRACKING SYSTEM, issued Sep. 18, 1990 to Robert G. Lepore et al., the teachings of which are incorporated herein by reference.

Figure 5:
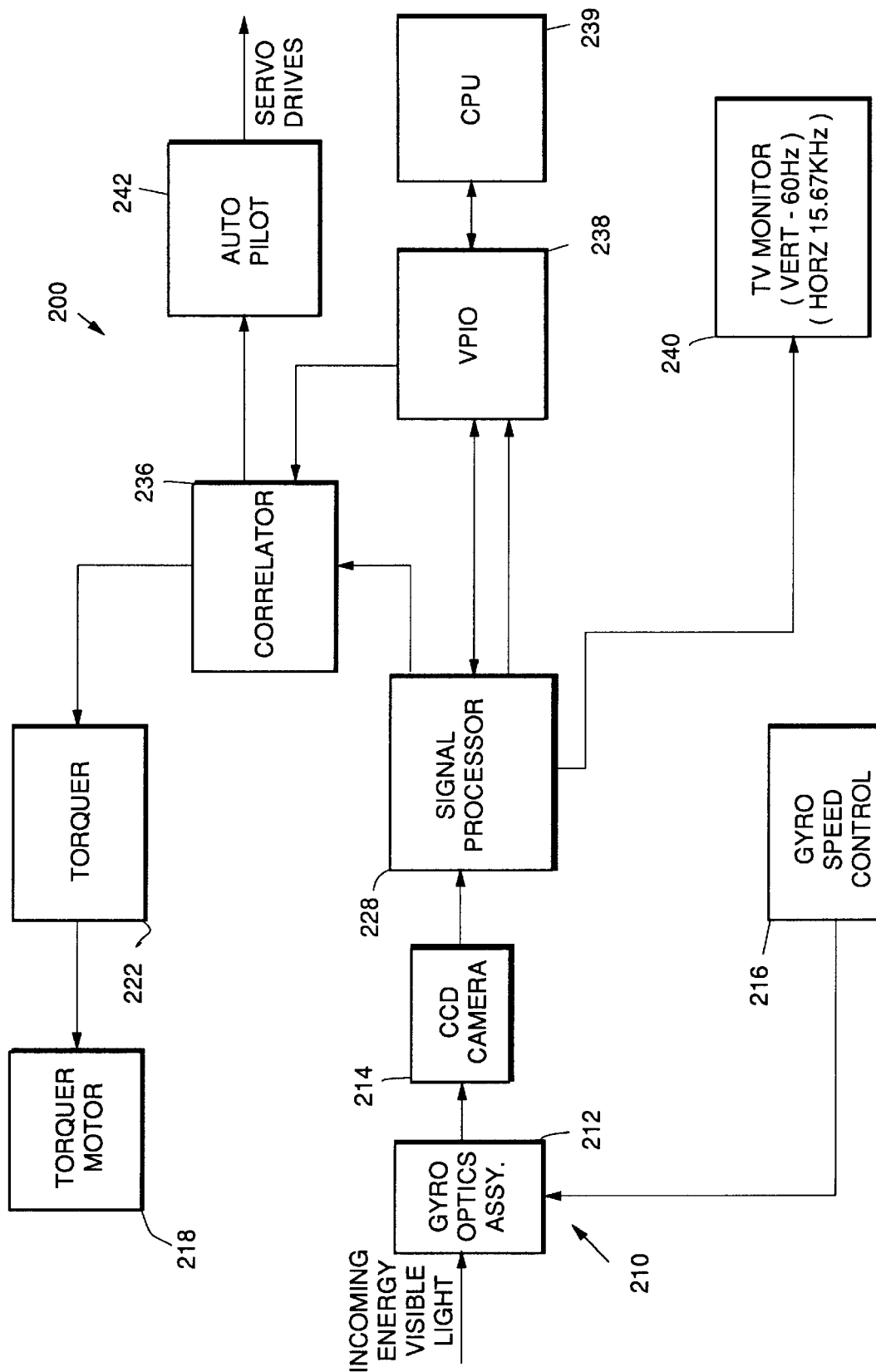
FIG. 5 is a detailed block diagram of an illustrative implementation of a video based digital tracking system incorporating the teachings of the present invention.

FIG. 5 is a detailed block diagram of an illustrative implementation of an infrared tracking system incorporating the teachings of the present invention. The system 200 includes a gyro-stabilized optical assembly 212 on which is mounted a CCD camera, infrared focal plane array, Vidicon, Newvicon or other image sensor providing standard television format output signals. In the illustrative embodiment of FIG. 5, a CCD camera 214 is utilized. A signal processor 228 transforms the CCD output for a video processor input/output circuit 238. The signal processor 228 provides gain and level shifting under control of a microprocessor 239. In the alternative, the gain may be controlled by the microprocessor 239 via the CCD camera 214. Threshold digitized signals are provided by the signal processor 228 to a correlator 236 which feeds a torquer and an autopilot 242 in a conventional manner. The signal processor 228 may also provide image rotation as may be necessary depending on the orientation by which a host missile is mounted.

Figure 6:
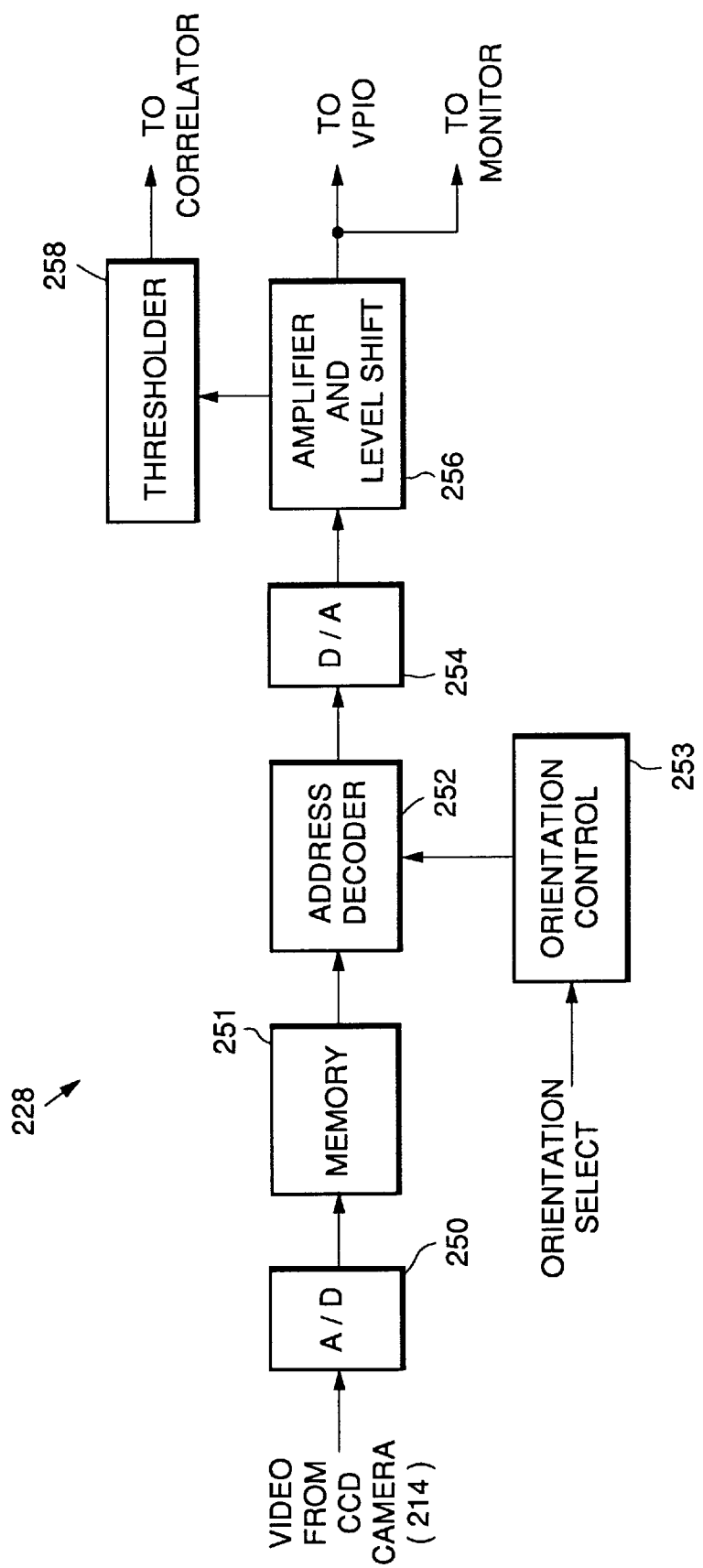
FIG. 6 is a block diagram of an illustrative implementation of the signal processor utilized in the video based digital tracking system of the present invention.

FIG. 6 is a block diagram of an illustrative implementation of the signal processor 228. The signal processor 228 is shown with an optional digital image rotation circuit including an analog-to-digital converter 250, a memory 251, an address decoder 252, an orientation controller 253, and a digital-to-analog converter 254. As analog data is generated by the sensor 214, it is digitized and stored in the memory 251. Orientation selection is effected through a logic circuit which generates control signals for the address decoder 252. The address decoder 252 generates addresses to select data from the memory 251 to effect rotation of the image as necessary depending on the orientation by which the host missile is mounted. The signal is converted back to analog and provided to an amplification and level shifting circuit 256.

A video rotation circuit may be designed in accordance with conventional teachings and used to provide proper image orientation regardless of the mounting orientation of the system.

The amplifier and level shifting circuit 256 adjusts the gain and level of the analog signal under control of the central processing unit 239 of the digital tracking system 220 and provides an intermediate analog output signal in response thereto. A threshold comparator 258 digitizes the output of the amplifier and level shifting circuit 256 to provide an intermediate digital output signal for the correlator 236.

The signal processor 228 allows for the use of a conventional digital processor 220, i.e., the correlator 236 and the centroid tracking central processing unit 239. The torquer motor 218, torquer 222, autopilot 242, gyro speed control 216 and monitor 240 of FIG. 5 may be of the same design as those of FIG. 3. This facilitates an inexpensive upgrade of many conventional systems to allow use of a video sensor with a digital tracking system.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A system for tracking a target, said system comprising:
   first means for providing standard television format video input signals;
   a signal processor for processing said video input signals to provide intermediate analog and digital signals;

a control tracker for processing said intermediate analog signals to provide centroid tracking of said target; and a correlation tracker for processing said intermediate digital signals to provide correlation tracking of said target.

2. The invention of claim 1 wherein said first means is a charge coupled device image sensor.

3. The invention of claim 1 wherein said signal processor includes an amplifier and level shifting circuit for providing said intermediate analog signals.

4. The invention of claim 3 wherein said signal processor includes a thresholding circuit for providing said intermediate digital signals.

5. The invention of claim 1, wherein said signal processor includes means for rotating said video input signals, and wherein said video rotation means includes means for digitizing said input video signals.

6. The invention of claim 5 wherein said video rotation means includes means for storing said digitized video input signals in a first format.

7. The invention of claim 6 wherein said video rotation means includes means for reading said stored digitized video input signals in a second format to provide digitized rotated output signals.

8. The invention of claim 7 wherein said video rotation means includes means for converting said digitized rotated output signals to analog rotated output signals.

9. The invention of claim 1 wherein said first means is an infrared focal plane array.

10. The invention of claim 1 wherein said first means is a Vidicon camera.

11. The invention of claim 1 wherein said first means is a Newvicon camera.

* * * * *